(12) United States Patent
Chanasyk et al.

(10) Patent No.: US 6,942,375 B2
(45) Date of Patent: Sep. 13, 2005

(54) VEHICLE ACCESSORY POWER ARRANGEMENT

(75) Inventors: Larry N. Chanasyk, Chatham (CA); William C. McNeilly, Fort Wayne, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 65 days.

(21) Appl. No.: 10/282,576

(22) Filed: Oct. 29, 2002

(65) Prior Publication Data

US 2004/0081014 A1 Apr. 29, 2004

(51) Int. Cl.⁷ .............................................. B28C 5/18
(52) U.S. Cl. ........................................................ 366/61
(58) Field of Search .......................... 366/44, 54, 46–62

(56) References Cited

U.S. PATENT DOCUMENTS

| | | | |
|---|---|---|---|
| 2,729,435 A | * | 1/1956 | Harbers et al. ............... 366/61 |
| 3,080,152 A | * | 3/1963 | Lendved ....................... 366/44 |
| 3,160,398 A | * | 12/1964 | Green .......................... 366/61 |
| 3,215,411 A | * | 11/1965 | Pitts ............................ 366/61 |
| 6,159,102 A | | 12/2000 | Hennessey et al. |

FOREIGN PATENT DOCUMENTS

GB 936493 * 9/1963

* cited by examiner

Primary Examiner—David Sorkin
(74) Attorney, Agent, or Firm—Jeffrey P. Calfa; Dennis Kelly Sullivan; Susan L. Lukasik

(57) ABSTRACT

A vehicle with one or more accessory systems that are capable of drawing power from a flow of pressurized hydraulic fluid and utilizing that power toward their intended functionality. The vehicle has a powertrain including a primary internal combustion engine and driveline components that are operable to couple the driveline end of a crankshaft of the primary internal combustion engine to one or more driven ground-engaging components of the vehicle to move the vehicle along the ground. The vehicle includes a hydraulic pump that is coupled to the non-driveline end of the crankshaft and that provides a flow of pressurized hydraulic fluid for powering the accessory systems of the vehicle.

20 Claims, 8 Drawing Sheets

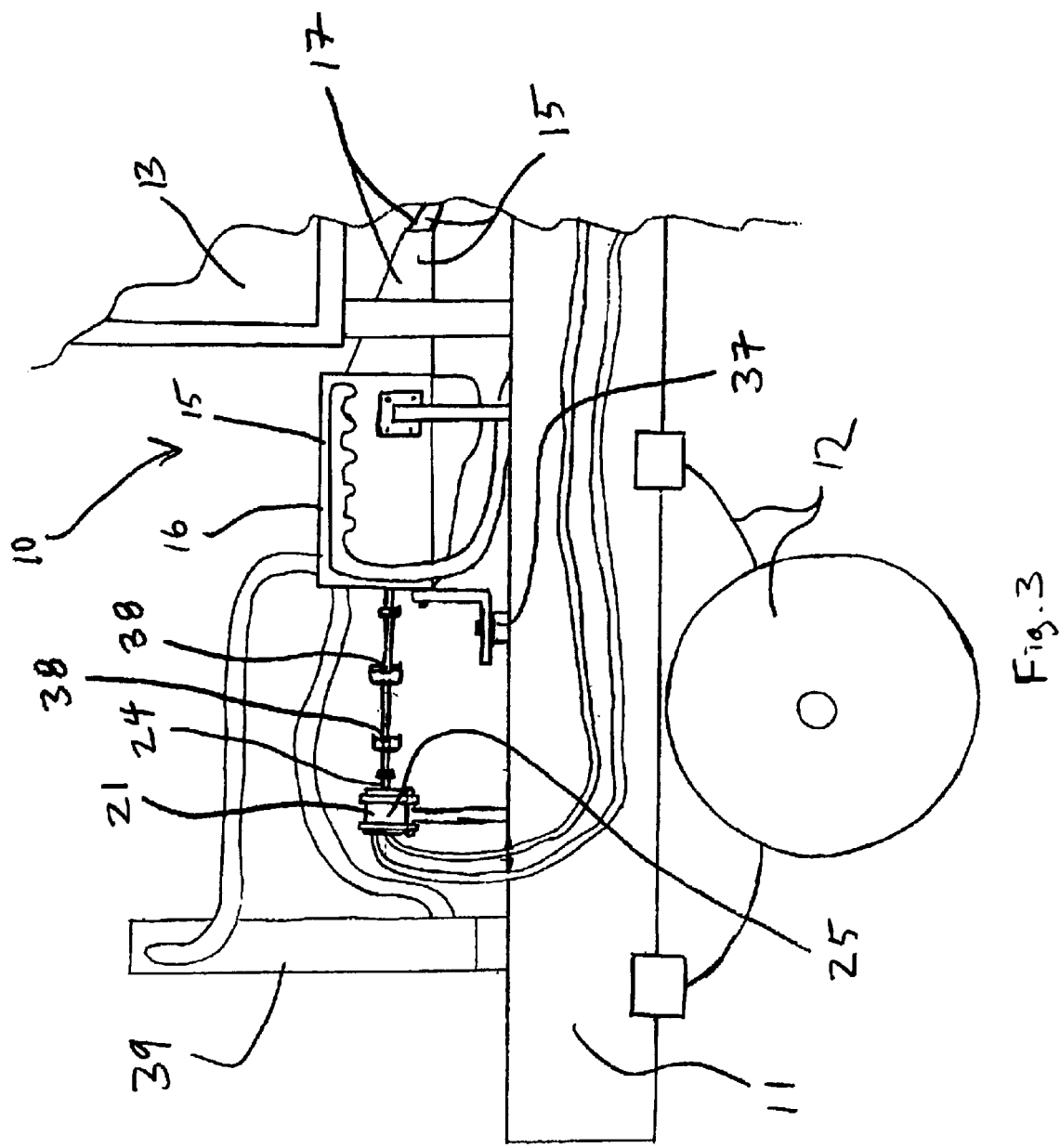

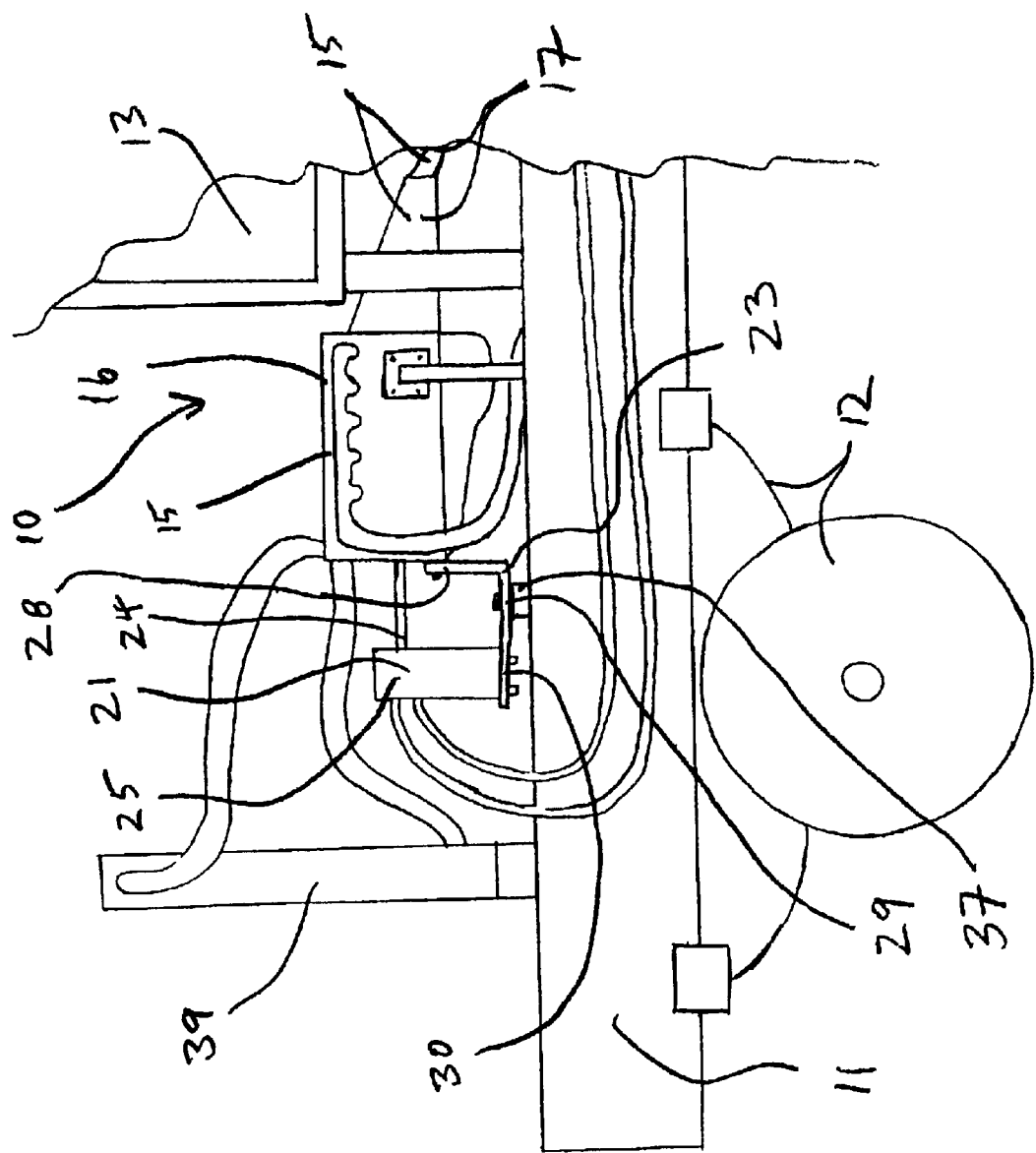

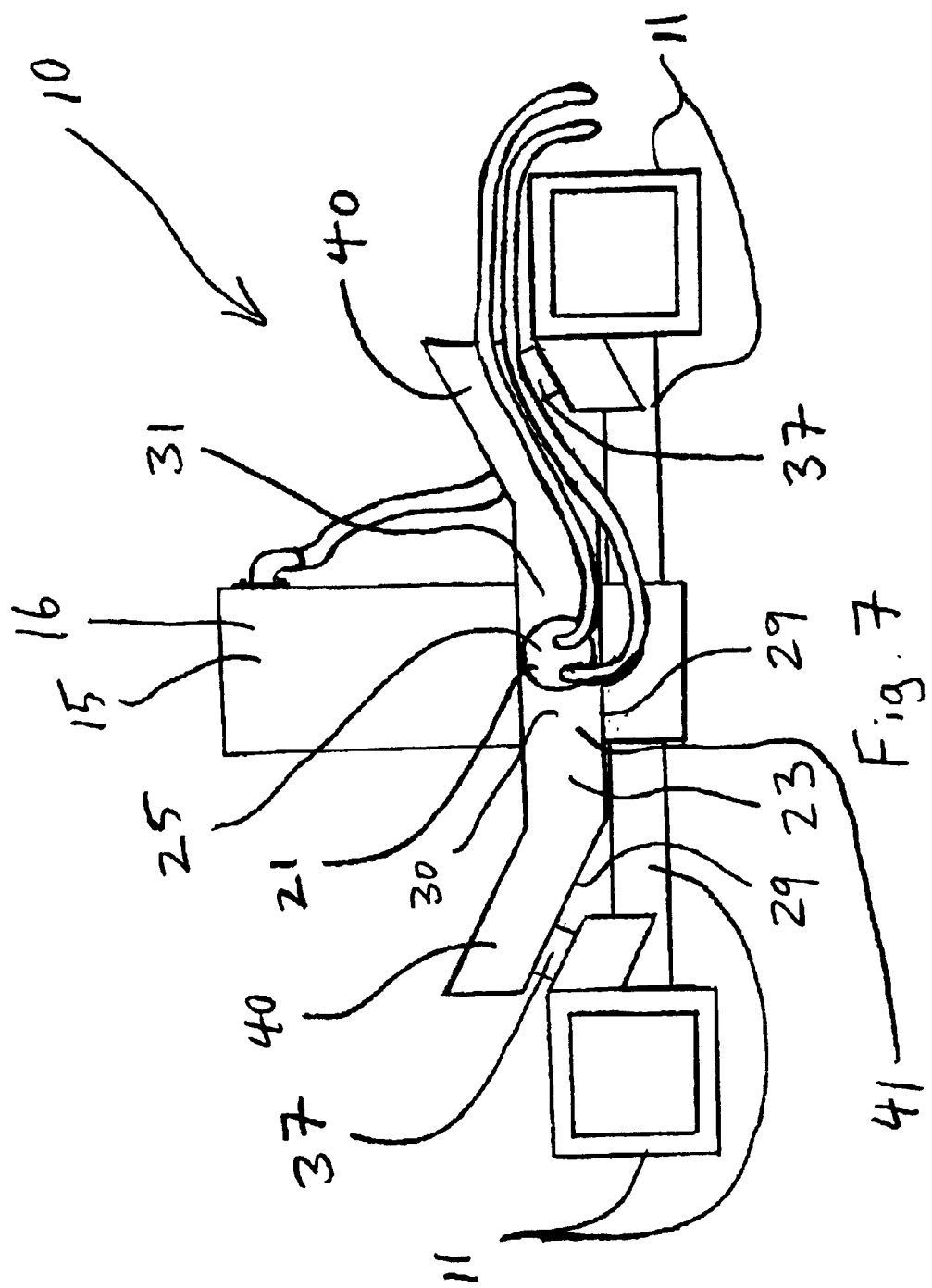

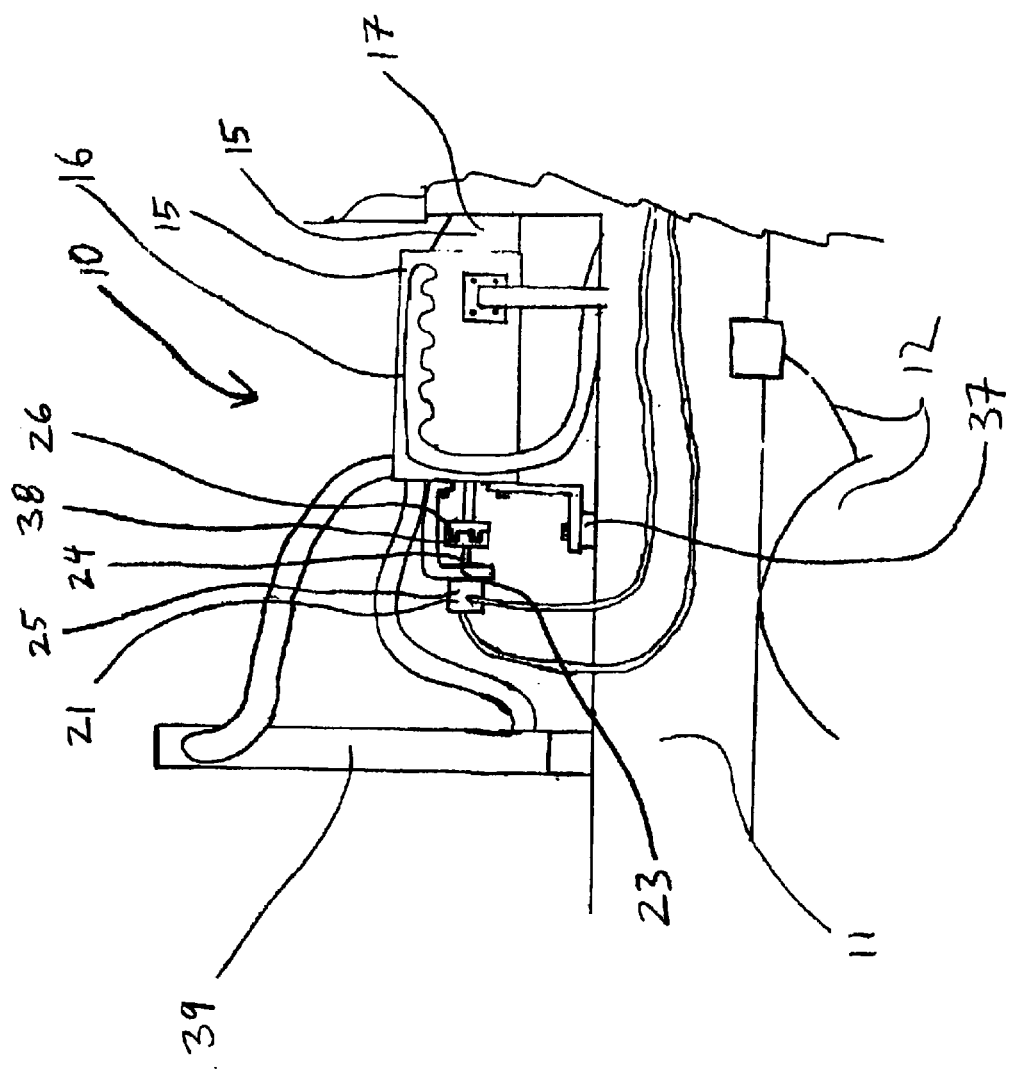

VEHICLE ACCESSORY POWER ARRANGEMENT

BACKGROUND OF THE INVENTION

The present invention relates to vehicles that have a drivetrain with a primary internal combustion engine to drive the vehicle along the ground and accessories that are also powered by the primary internal combustion engine of the vehicle.

DRAWINGS

Other objects and advantages of the invention will become more apparent upon perusal of the detailed description thereof and upon inspection of the drawings in which.

DETAILS OF INVENTION

Figure 1:
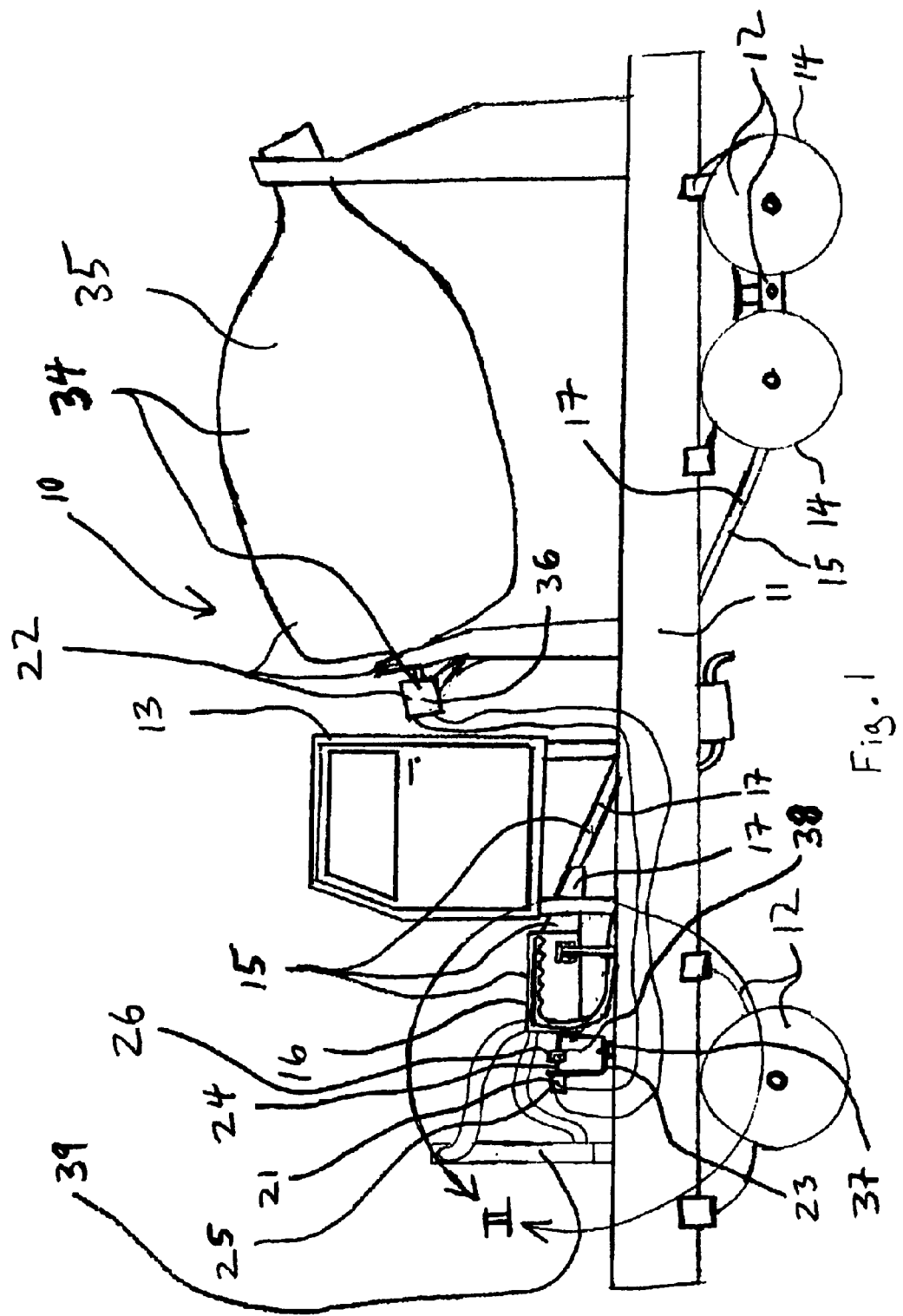
FIG. 1 is a side elevational view of a vehicle according to the present invention that has a hydraulic pump rigidly engaged, through a pump-mounting bracket that includes a vertically-extending pump-mounting wall, to an end of a primary internal combustion engine adjacent a non-driveline end of its crankshaft.
Figure 2:
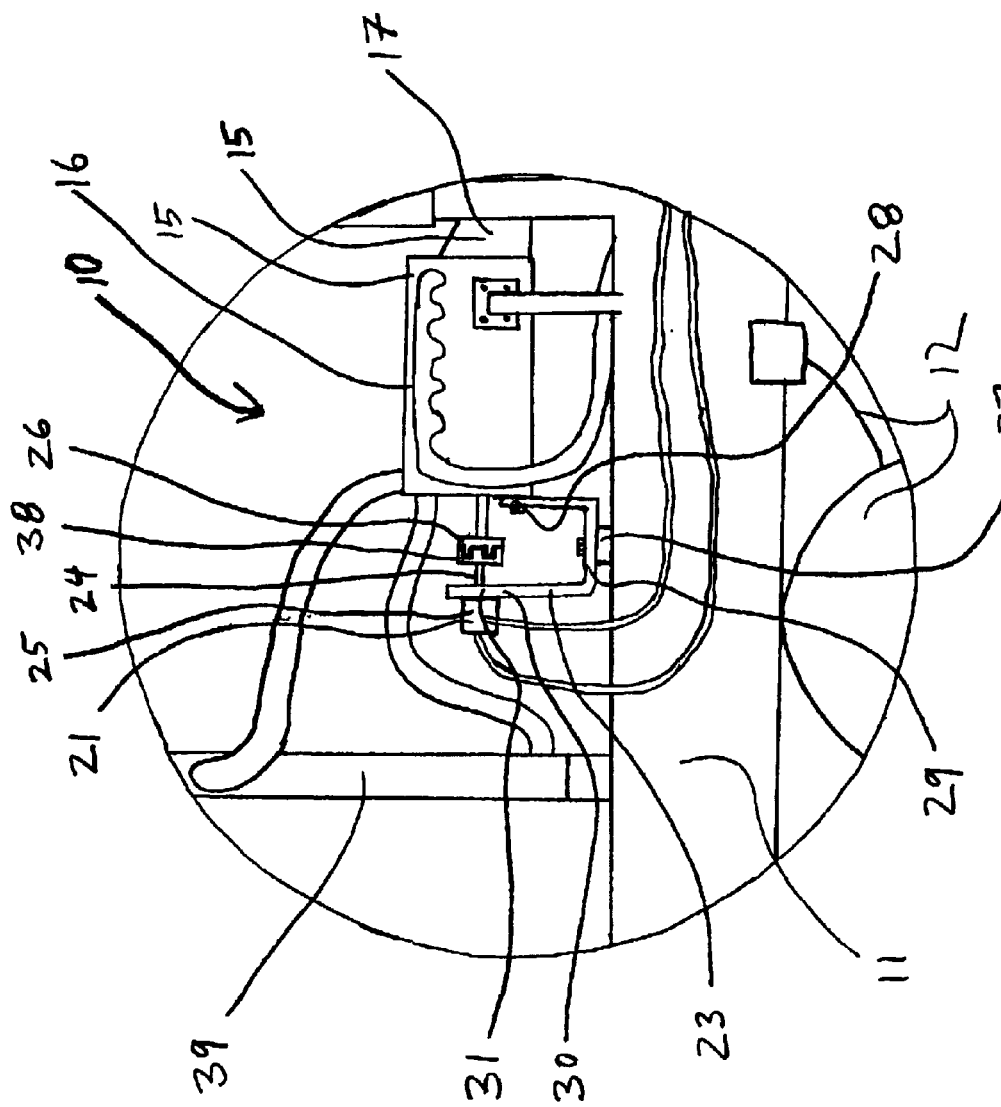
FIG. 2 is a close-up view of the portion of FIG. 1 that is circumscribed by circle II.
Figure 5:
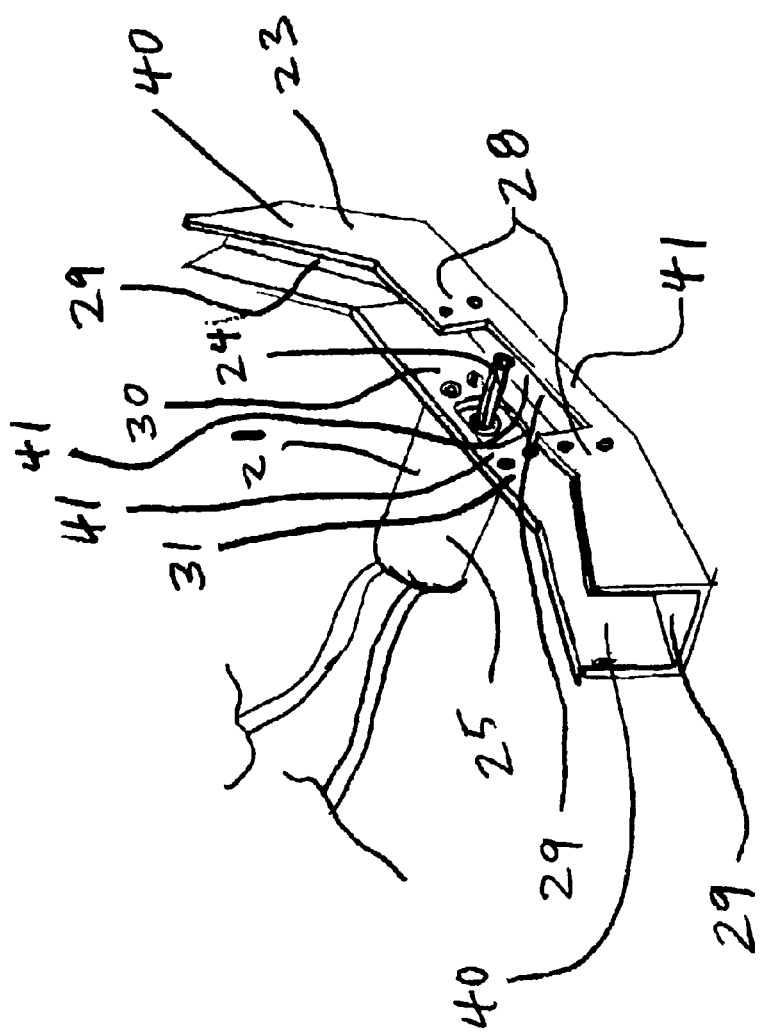
FIG. 5 is a perspective view of a hydraulic pump mounted to pump-mounting bracket that is in accordance with the present invention and that includes a bridge portion that has a center portion below the input shaft of the hydraulic pump and wing portions that extend angularly upward from the center portion of the bridge portion.

The present invention is a novel arrangement for providing power for accessory systems 22 of a vehicle 10. FIGS. 1–8 illustrate various features and assemblies of the present invention. A vehicle 10 according to the present invention comprises one or more rigid frame structures 11 to which a majority of the other components of the vehicle 10 are directly or indirectly engaged and from which those components of the vehicle 10 derive support directly or indirectly. A vehicle 10 according to the present invention further comprises a suspension system 12 that is constructed and engaged to the one or more frame structures 11 of the vehicle 10 in such a manner to support the frame structures 11 above the ground. The suspension system 12 is further constructed in such a manner to provide the vehicle 10 with a relatively low resistance to movement along the ground. The vehicle 10 also comprises one or more driven ground-engaging components 14 that are part of the suspension system 12 of the vehicle and that are also part of a powertrain 15 of the vehicle 10. In addition to the driven ground-engaging components 14, the powertrain 15 of the vehicle 10 comprises a primary internal combustion engine 16 that produces power. The primary internal combustion engine 16 is mounted to one of the one or more frame structures 11 of the vehicle 10. The powertrain 15 of the vehicle 10 further comprises driveline components that are operable to connect a driveline end of a crankshaft of the primary internal combustion engine 16 to the driven ground-engaging components 14 of the vehicle 10 in such a manner that power may be transmitted from the driveline end of the crankshaft, through the driveline components 17 to the driven ground-engaging components 14 of the vehicle 10. When power is transmitted from the driveline end of the crankshaft, through the driveline components 17, to the driven ground-engaging components 14 of the vehicle 10, the driven ground-engaging components 14 of the vehicle 10 are caused to rotate relative to the frame structures 11 of the vehicle 10 and the vehicle 10 is caused to move along the ground.

The powertrain 15 of a vehicle 10 according to the present invention may be constructed and engaged to the other components of the vehicle 10 in any of a number of ways well-known to and/or easily imaginable by one of ordinary skill in the art. In some embodiments of the present invention the driveline components 17 of the powertrain 15 comprise a multiple-speed-ratio transmission that is mounted to an end of the primary internal combustion engine 16 adjacent the driveline end of the crankshaft thereof. In some such embodiments of the present invention the multiple-speed-ratio transmission has an input shaft that is either coupled to the driveline end of the crankshaft through a fluid coupling or that may be selectively coupled to or decoupled from the driveline end of the crankshaft through a clutch. In most such embodiments of the present invention the multiple-speed-ratio transmission has an output shaft that may be selectively coupled to or decoupled from the input shaft of the multiple-speed-ratio transmission. In most such embodiments of the present invention the output shaft of the multiple-speed-ratio transmission is coupled to a series of one or more driveshafts that are coupled at an opposite end to an input shaft of an axle which is coupled through a ring and pinion gear and axle shafts to the driven ground-engaging component(s) 14 of the vehicle 10.

A vehicle 10 according to the present invention also comprises one or more accessory systems that require power for operation and that are capable of receiving a flow of pressurized hydraulic fluid, drawing power therefrom and utilizing that power to execute the intended function of the accessory system. There are innumerable different types of accessory systems 22 that constructed in such a manner and the use of which on a vehicle 10 is well-known to and/or easily imaginable by a person of ordinary skill in the art. One such type of accessory system 22 that a vehicle 10 according to the present invention may comprise is a large slurry mixer 34 such as is shown in FIG. 1. Such large slurry mixers 34 generally comprise a large mixing-barrel 35 that has mixing paddles mounted in its interior. In operation the large mixing barrel 35 of such a large slurry mixer 34 is rotated by a hydraulic motor of the large slurry mixer 34 and liquid and/or granular contents of the large mixing barrel 35 are tumbled and mixed by the mixing paddles inside the large mixing barrel 35. Vehicles 10 with such large slurry mixers 34 are generally used by pre-mixed concrete vendors to mix the constituent parts of the concrete while transporting it to the customer's construction site.

A vehicle 10 according to the present invention comprises a hydraulic pump 21 that is powered by the primary internal combustion engine 16 of the vehicle 10 and that provides a flow of pressurized hydraulic fluid. When in operation the hydraulic pump 21 delivers pressurized hydraulic fluid to an output port and from there the pressurized hydraulic fluid travels through tubing to the one or more of the accessory systems 22 of the vehicle 10 which derive power from the flow of pressurized hydraulic fluid to perform their intended function. After power is drawn from a given portion of the flow of pressurized hydraulic fluid by one or more accessory systems 22 of the vehicle 10 that portion of the flow of pressurized hydraulic fluid returns either immediately to an intake port of the hydraulic pump 21 or to a hydraulic fluid reservoir and then to the intake port of the hydraulic pump 21.

The hydraulic pump 21 of a vehicle 10 according to the present invention derives power from an input shaft 24 of the hydraulic pump 21 which is coupled to and driven by a non-driveline end of the crankshaft of the primary internal combustion engine 16 of the vehicle 10. In some embodiments of the present invention, such as those shown in FIGS. 1–8, the non-driveline end of the crankshaft of the primary internal combustion engine 16 is disposed forward of the driveline end of the crankshaft to which the driveline components 17 are coupled when the vehicle 10 is driven. In other embodiments of the present invention the non-driveline end of the crankshaft of the primary internal combustion engine 16 will be disposed behind the driveline end of the crankshaft to which the driveline components 17 are coupled when the vehicle 10 is driven. In still other embodiments of the present invention the primary internal combustion engine 16 of a vehicle 10 will be arranged with its crankshaft oriented laterally of the longitudinal axis of the vehicle 10 and the non-driveline end of the crankshaft of the primary internal combustion engine 16 will spaced laterally from the driveline end of the crankshaft to which the driveline components 17 are coupled when the vehicle 10 is driven.

The hydraulic pump 21 of a vehicle 10 is mounted to the vehicle 10 adjacent an end of the primary internal combustion engine 16 at which the non-driveline end of its crankshaft is disposed. The position of the hydraulic pump 21 is further such that its input shaft 24 is substantially aligned with a centerline of the crankshaft of the primary internal combustion engine. For purposes of this disclosure, stating that the input shaft 24 of the hydraulic pump 21 and the centerline of the crankshaft are substantially in alignment with one another means that any variance from alignment therebetween is a result of imperfect manufacturing and assembly processes. The body 25 of the hydraulic pump 21 is rigidly mounted directly or indirectly to the primary internal combustion engine 16 and/or the frame structure 11 to which the primary internal combustion engine 16 is mounted. In embodiments of the present invention, such as those shown in FIGS. 1, 2, 4, 6, 7, and 8, in which the body 25 of the hydraulic pump 21 is rigidly mounted to the primary internal combustion engine 16 maintenance of alignment between the input shaft 24 of the hydraulic pump 21 and the centerline of the crankshaft during operation of the vehicle 10 is ensured. This is advantageous in embodiments of the present invention in which the primary internal combustion engine 16 is mounted to the frame structure 11 of the vehicle 10 in such a manner that it may move slightly with respect to the frame structure 11.

In some embodiments of the present invention, such as those shown in FIGS. 1, 2, 4, 6, 7, and 8, the hydraulic pump 21 is rigidly mounted in spaced relationship to the primary internal combustion engine 16 by a pump-mounting bracket 23. Such a pump-mounting bracket 23 may have virtually any construction that enables it to effect rigid mounting of the hydraulic pump 21 in spaced relationship with the portion of the primary internal combustion engine 16 adjacent the non-driveline end of the crankshaft and with the input shaft 24 of the hydraulic pump 21 in alignment with the centerline of the crankshaft. Having reviewed this disclosure and its associated drawings, a person of ordinary skill in the art could easily construct pump-mounting brackets 23 and engage them to a primary internal combustion engine 16 in innumerable different ways in accordance with the teachings of the present invention.

In some embodiments of the present invention, such as those shown in FIGS. 1, 2, 4, 6, and 7, a pump-mounting bracket 23 may be engaged to the primary internal combustion engine 23, the body 25 of the hydraulic pump 21, and one of the frame structures 11 of the vehicle 10 in such a manner that the pump-mounting bracket 23 is supported by the frame structure 11 and the pump-mounting bracket 23, in turn, supports both the portion of the primary internal combustion engine 16 to which the pump-mounting bracket 23 is engaged and the body 25 of the hydraulic pump 21. Considerable cost and space efficiencies are realized by constructing a pump-mounting bracket 23 that functions to support a portion of the primary internal combustion engine 16 from the frame structure 11 and to rigidly mount the hydraulic pump 21 to the primary internal combustion engine 16. Having reviewed this disclosure and its associated drawings, a person of ordinary skill in the art could easily construct pump-mounting brackets 23 and engage them to a primary internal combustion engine 16 a hydraulic pump 21 and a frame structure 11 of a vehicle 10 in innumerable different ways that would effect such a dual mounting functionality of the pump-mounting bracket 23. In some embodiments of the present invention in which the pump-mounting bracket 23 functions to support both the primary internal combustion engine 16 and the hydraulic pump 21 from one of the frame structures 11 of the vehicle 10, there are elastomeric isolators 37 sandwiched between the pump-mounting bracket 23 and the frame structure 11. In such embodiments elastic deformation of the elastomeric isolators 37 allows for slight movement of the primary internal combustion engine 16 and the hydraulic pump 21 in unison relative to the frame structure 11.

In some embodiments of the present invention a pump-mounting bracket 23 includes a vertically-extending engine-engaging portion 28 that is engaged to the portion of the primary internal combustion engine 16 adjacent the non-driveline end of the crankshaft and the pump-mounting bracket 23 also comprises one or more bridge portions 29 that extend away from its engine-engagement portion 28 and the primary internal combustion engine 16 in directions parallel to the centerline of the crankshaft. In these embodiments of the present invention one or more of the bridge portions 29 of the pump-mounting bracket 23 are engaged to and supported by the frame structure 11 of the vehicle 10. Of course in some such embodiments of the present invention, such as those shown in FIGS. 1, 2, 4, 6, 7, and 8, one or more of the bridge portions 29 are engaged to and supported by the frame structure 11 indirectly through elastomeric isolators 37. In some embodiments of the present invention the pump-mounting bracket 23 comprises a pump-mounting portion 30 that is engaged to its bridge portions 29 at a side thereof opposite the engine-engaging portion 28. Such a construction of and arrangement of a vehicle 10 with one or more bridge portions 29 of the pump-mounting bracket 23 engaged to and supported by a frame structure 11, an engine-engaging portion 28 of the pump-mounting bracket 23 engaged to one side of the bridge portions 29 and a pump-mounting portion of the pump-mounting bracket 23 engaged to the opposite side of the bridge portions 29 results in considerable efficiencies of space utilization and economics. In some embodiments of the present invention, such as those shown in FIGS. 1, 2, 5, 6, and 7, the pump-mounting portion 30 of the pump-mounting bracket 23 is a vertically-extending pump-mounting wall 31. Construction of a pump-mounting bracket 23 with such a vertically-extending pump-mounting wall 31 provides a convenient place to mount many types of hydraulic pumps, which often have mounting faces adjacent to and perpendicular to their input shaft 24. In some embodiments of the present invention the bridge portions 29 of a pump-mounting bracket 23 is/are disposed below and/or beside, but not directly above, the centerline of the crankshaft of the primary internal combustion engine 16. Absence of bridge portions 29 directly above the centerline of the crankshaft of the primary internal combustion engine 16 advantageously leaves clear a space for accessory drive belts to extend upwardly from a crankshaft pulley of the primary internal combustion engine to drive pulleys of engine-mounted accessory components such as alternating-current generators, fan drives, air compressors, and refrigerant compressors.

Figure 6:
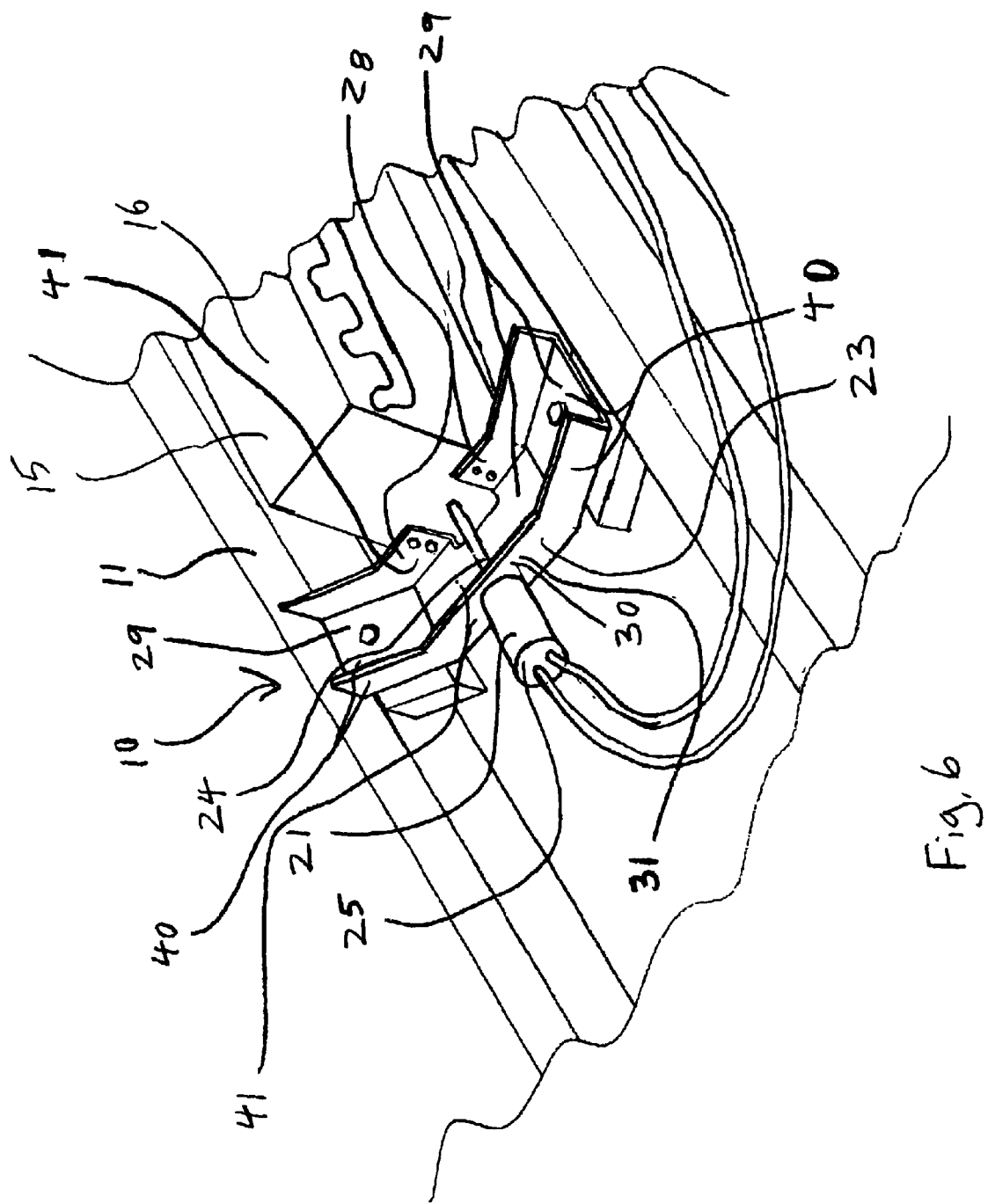
FIG. 6 is a perspective view of a portion of a vehicle according to the present invention that has both a portion of its primary internal combustion engine and the hydraulic pump of the vehicle mounted to the frame structure of the vehicle by the pump-mounting bracket shown in FIG. 5.
Figure 1:
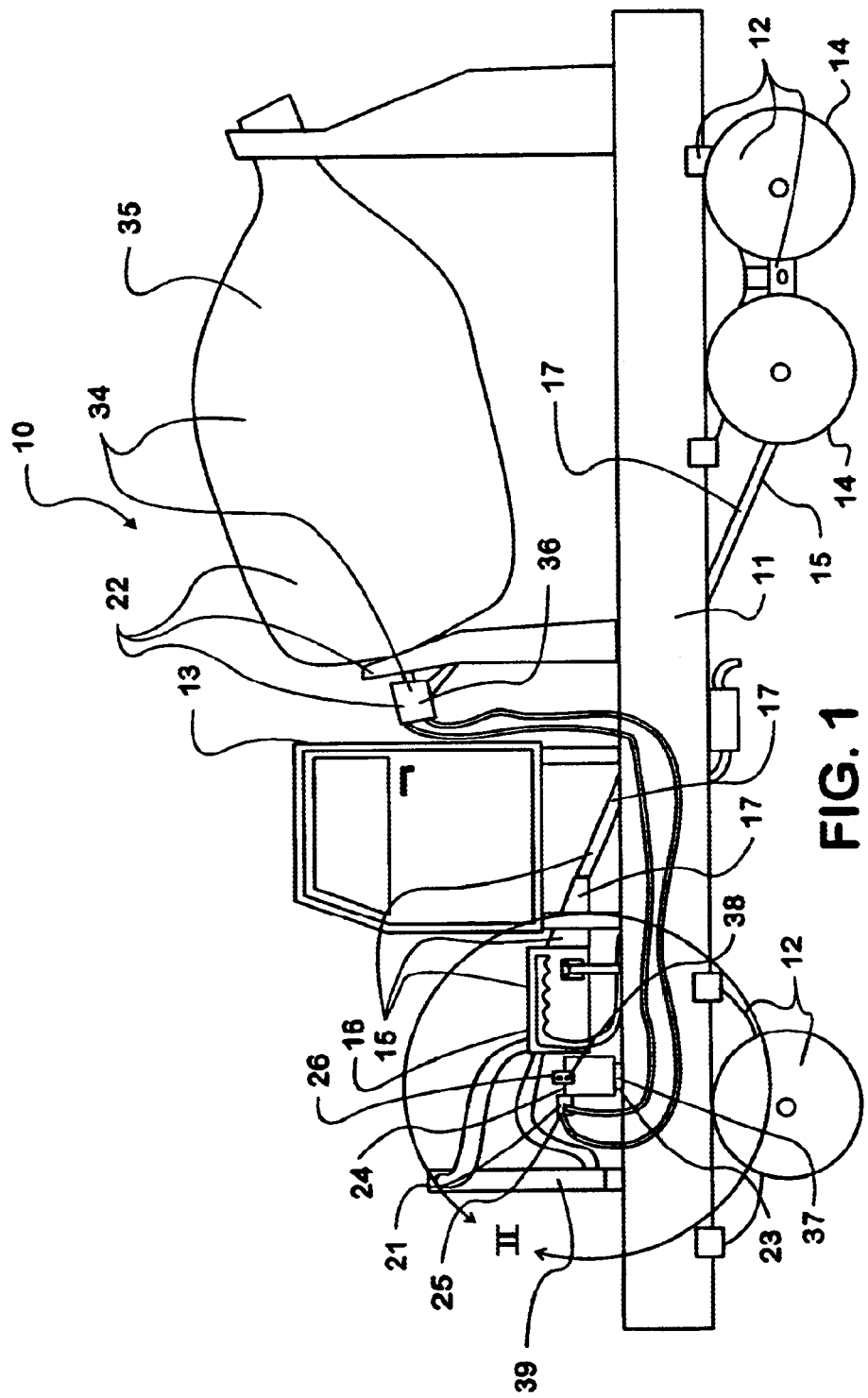
Figure 2:
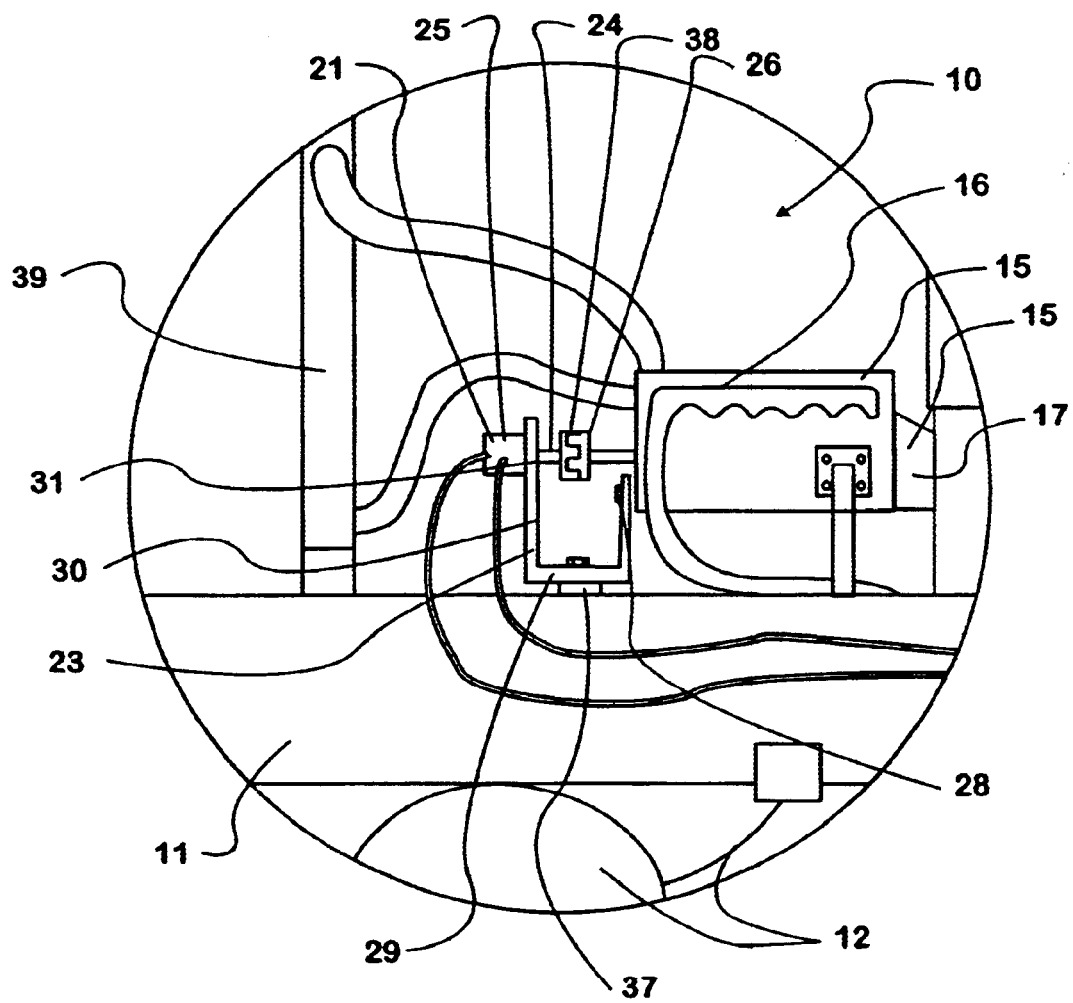
Figure 7:
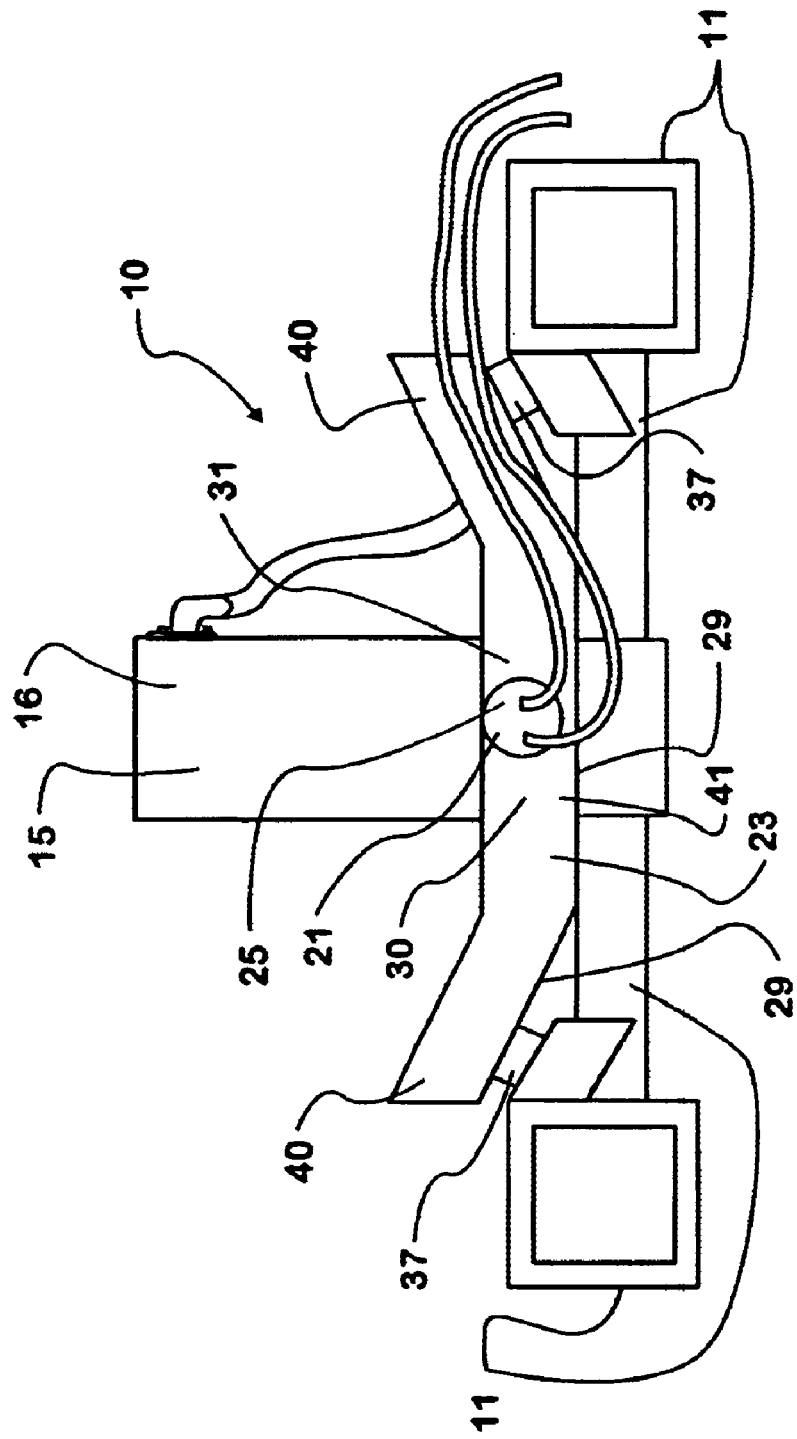
FIG. 7 is a view of the assembly of FIG. 6 in the direction of the crankshaft of the primary internal combustion engine.
Figure 8:
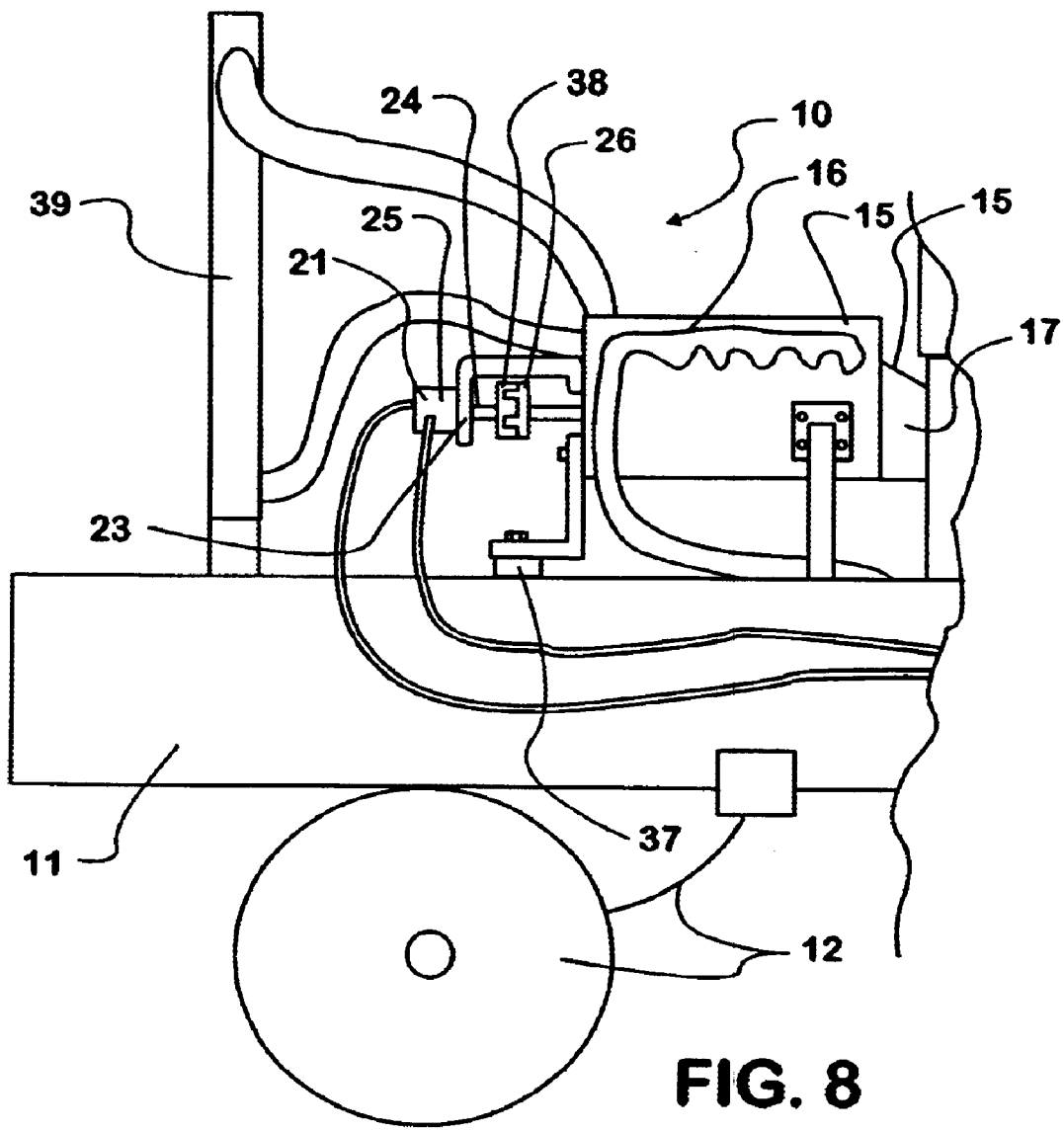
FIG. 8 is a view of a part of a vehicle that has a hydraulic pump rigidly mounted, through a pump-mounting bracket that is not engaged to the frame structure of the vehicle, to a portion of a primary internal combustion engine adjacent the non-driveline end of its primary internal combustion engine.

FIGS. 6 and 7 illustrate one embodiment of a pump-mounting bracket 23 that is constructed and engaged to a frame structure 11 of a vehicle 10 in such a manner that its engagement to the frame structure 11 is robust, both in vertical and horizontal directions. The pump-mounting bracket 23 shown in FIGS. 6 and 7 has a center portion 41 that extends laterally for some distance on either side of the hydraulic pump 21. The pump-mounting bracket 23 shown in FIGS. 6 and 7 also includes wings 40 that extend angularly upward from the center portion 41. Each of the wings 40 comprises a portion of the bridge portion 29 of the pump-mounting bracket 23. An underside of a bridge portion 29 of each of the wings 40 rests upon the frame structure 11. Because the underside of the bridge portion 29 of each of the wings 40 abuts the frame structure 11 in a direction that is partially vertical and partially horizontal, the engagement of the pump-mounting bracket to the frame structure 11 is robust in both vertical and horizontal directions. Also, because the points of abutment between the undersides of the bridge portion 29 of each of the wings 40 with the frame structure 11 are spaced significantly from each other in the lateral direction the engagement of the pump-mounting bracket 23 to the frame structure 11 is robust in transferring moments applied to the pump-mounting bracket 23 about axes perpendicular to the wings 40.

The input shaft 24 of the hydraulic pump 21 may be coupled to the non-driveline end of the crankshaft through any type of coupler that is capable of transmitting torque from the crankshaft to the input shaft of the hydraulic pump 21. Having reviewed this disclosure and the associated drawings, a person of ordinary skill in the art could construct vehicles 10 according to the present invention with innumerable different constructions of couplers and manners of engagement of those couplers to the crankshaft of the primary internal combustion engine and the input shaft 24 of the hydraulic pump 21. In some embodiments of the present invention, such as those shown in FIGS. 1, 2, 3, and 8, a flexible coupler 38 is used to couple the non-driveline end of the crankshaft to the input shaft 24 of the hydraulic pump 21.

Figure 3:
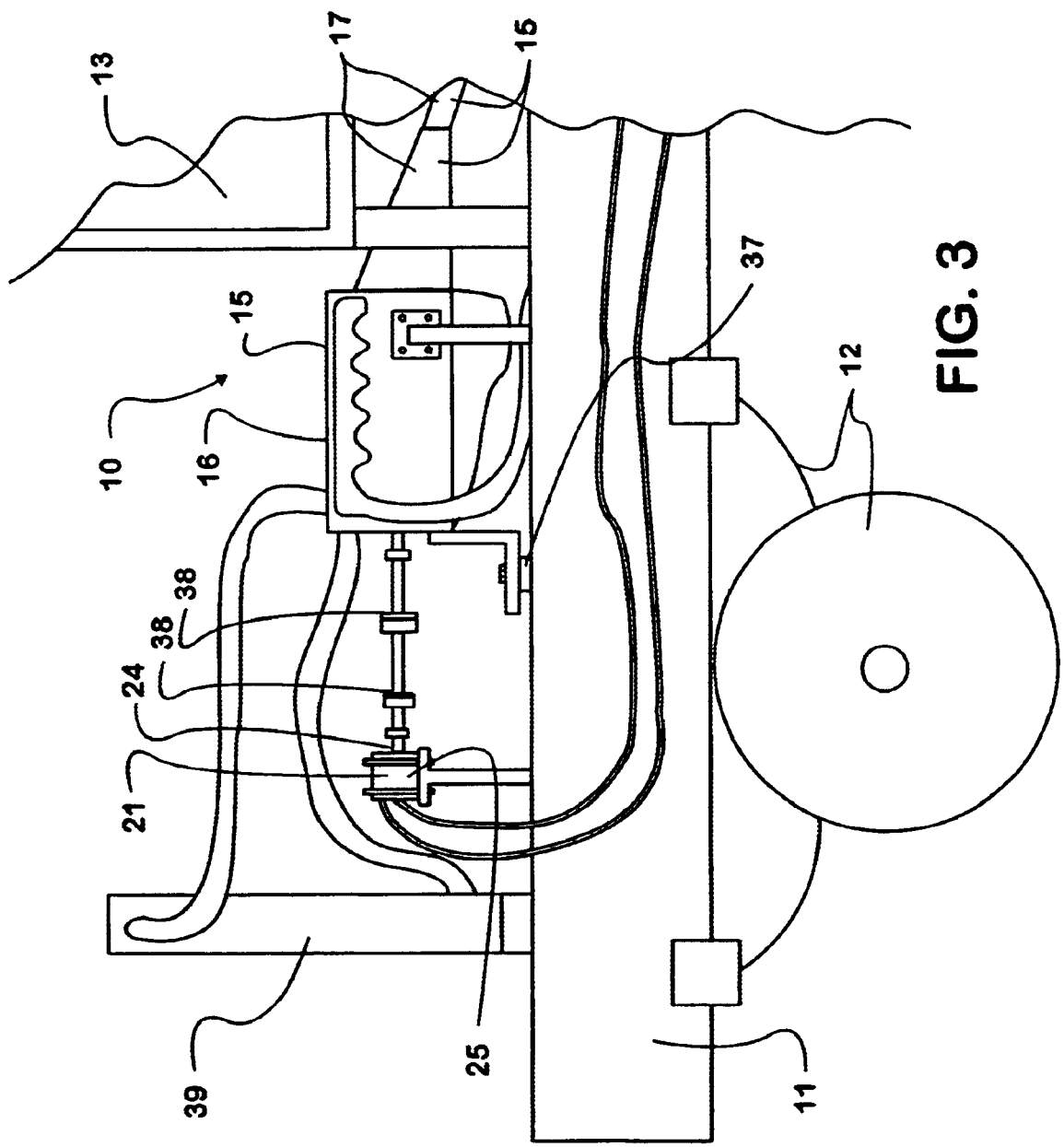
FIG. 3 is a view of a part of a vehicle according to the present invention that has a hydraulic pump mounted to a frame structure of the vehicle adjacent an end of a primary internal combustion engine of the vehicle at which the non-driveline end of the crankshaft of the primary internal combustion engine is disposed.
Figure 4:
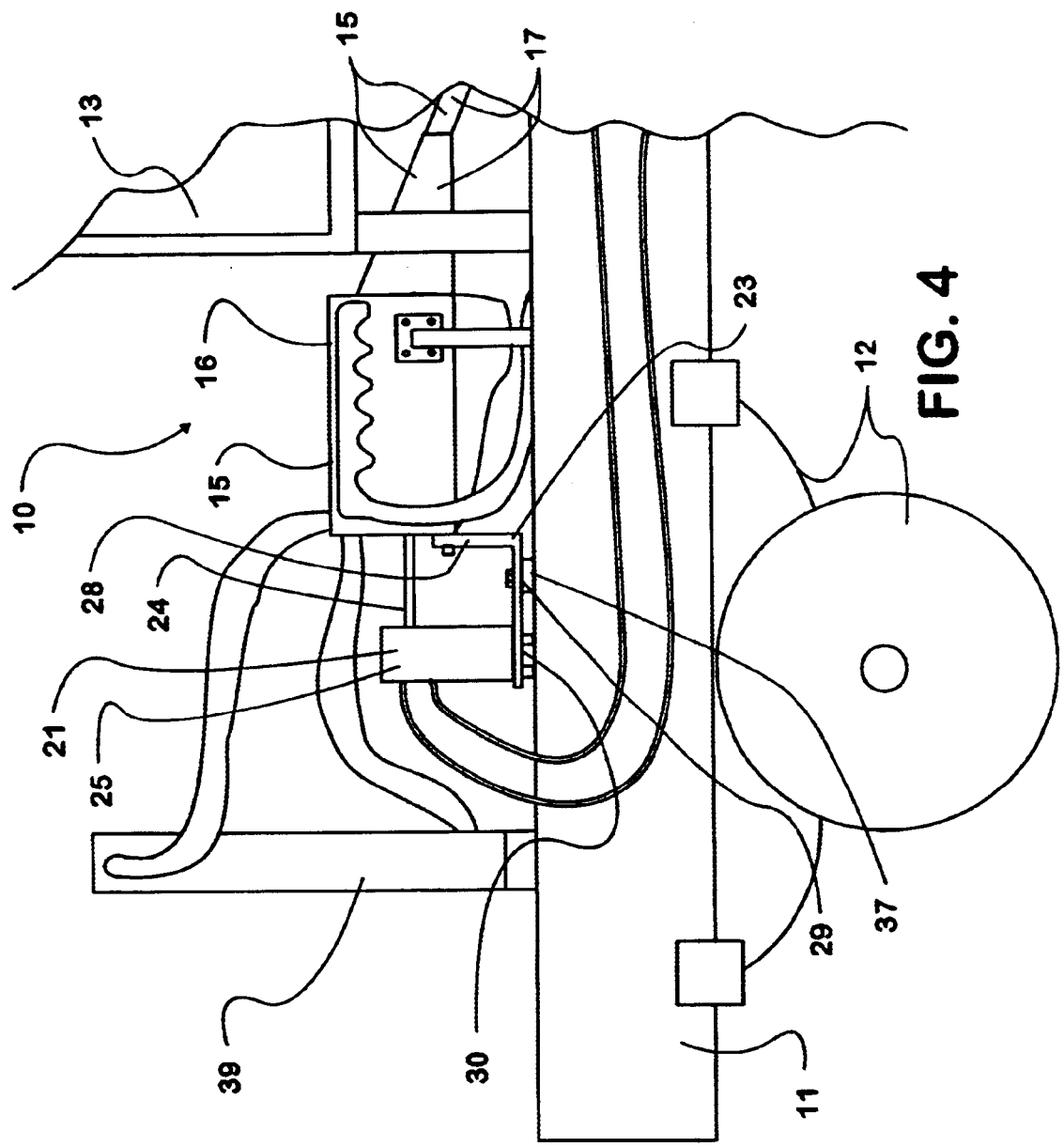
FIG. 4 is a view of a part of a vehicle that has a hydraulic pump rigidly mounted, through a pump-mounting bracket that does not have a vertically-extending pump-mounting wall, to a portion of a primary internal combustion engine adjacent the non-driveline end of its primary internal combustion engine.
Figure 5:
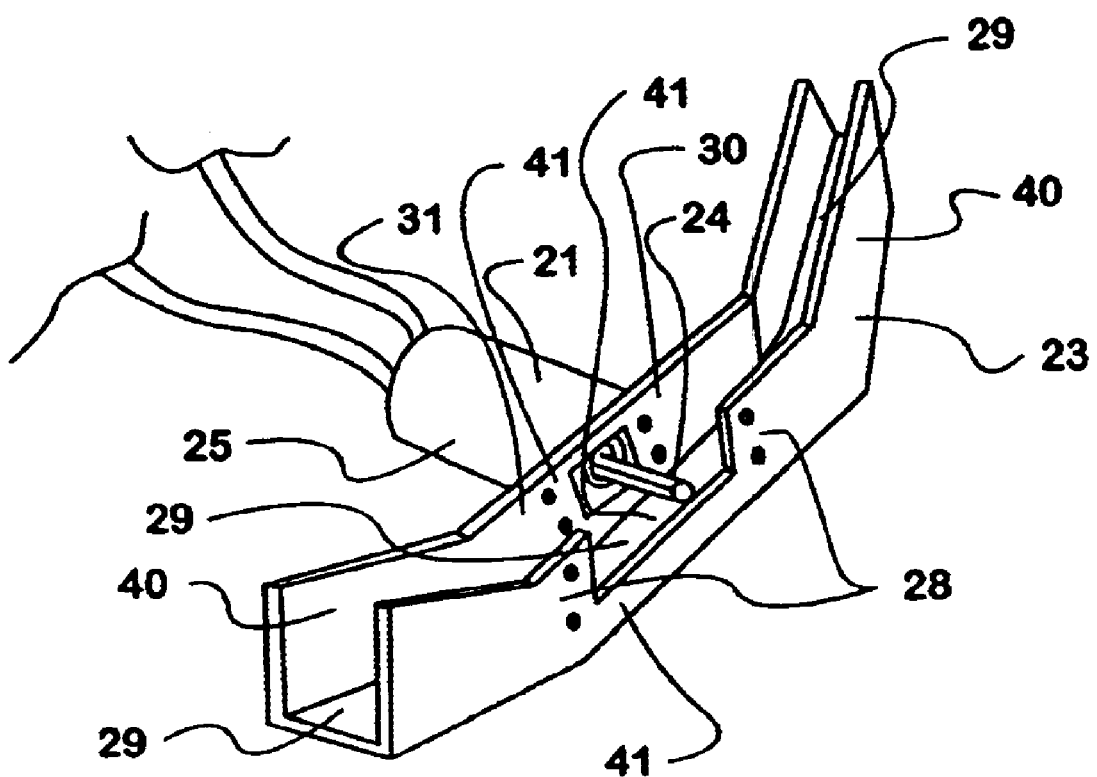
Figure 6:
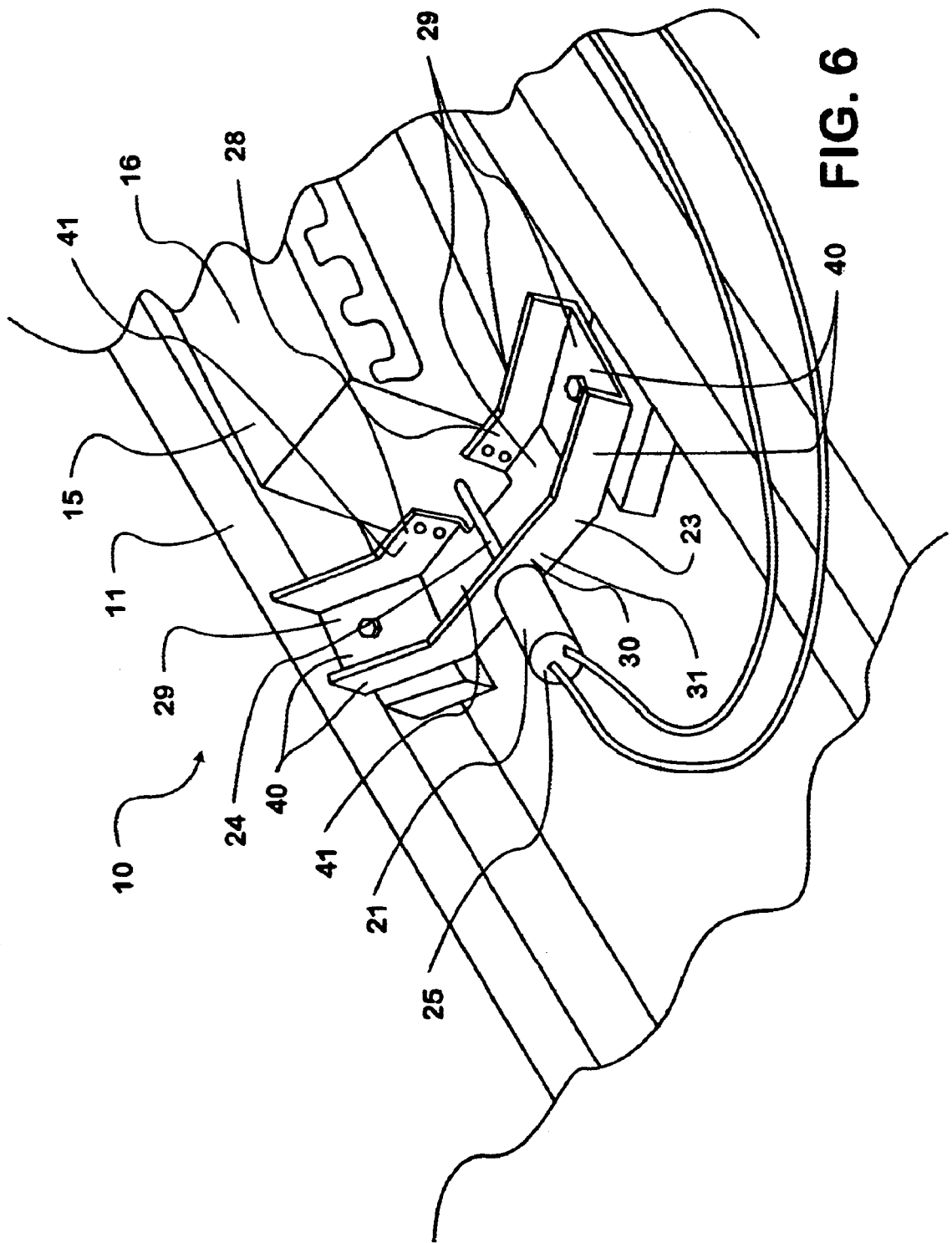

In some such embodiments of the present invention, such as those shown in FIG. 3, one or more of the flexible couplers 38 that are used to couple the non-driveline end of the crankshaft to the input shaft 24 of the hydraulic pump 21 are tight-joint flexible-couplers such as u-joints, constant-velocity joints, and double cardan joints. The torque-transmitting bodies of tight-joint flexible couplers are engaged to one another through close-fitting connection features. Generally the torque-transmitting bodies of such tight-fit flexible couplers are pivotally engaged to one another in such a manner that each is pivotally connected to the next. For instance, a conventional u-joint comprises three torque-transmitting bodies that are engaged to one another in series—a first yoke, a trunnion, and a second yoke. The first yoke and the trunnion are pivotally engaged to one another through a close-fitting engagement of journals of the trunnion within bores defined by the first yoke and the trunnion and second yoke are, in turn, pivotally engaged to one another through a close-fitting engagement of journals of the trunnion within bores defined by the second yoke. Tight-joint flexible couplers may be advantageously utilized in many applications of the present invention because they provide exceptional service life, efficiency, and are relatively radially compact for a given amount of torque-transmitting capability.

In some embodiments of the present invention a loose-joint flexible coupler is utilized to couple the non-driveline end of the crankshaft to the input shaft 24 of the hydraulic pump 21. Loose-joint flexible couplers comprise torque-transmitting bodies that are engaged to one another through loose-fitting connection features. An example of a loose-joint coupler is illustrated in U.S. Pat. No. 6,159,102 to Lovejoy, Inc.® which patent is incorporated herein by reference. The loose-joint flexible coupler that is illustrated and described in U.S. Pat. No. 6,159,102 comprises two torque-transmitting bodies that are hubs with axially-extending teeth that are loosely meshed with one another in such a manner that the two hubs may transmit rotation and torque between one another with their axes angularly and transversely misaligned. The voids between the connection features of torque-transmitting bodies of loose-joint flexible couplers may be vacant or it may be occupied by a relatively flexible material such as an elastomer that allows considerable movement between the connection features. The loose-joint flexible coupler shown in U.S. Pat. No. 6,159,102 is an example of a construction in which the voids between the connection features of its torque-transmitting bodies are occupied by a flexible material. Constructions of loose-joint flexible couplers that include flexible material that occupies the voids between the connection features of their torque-transmitting bodies generally also provide advantageous damping of vibration. Loose-joint flexible couplers may be advantageously employed in many applications of the present invention because they are relatively axially compact for a given amount of misalignment tolerance, they can tolerate both angular and transverse misalignment, and many embodiments that include flexible material that occupies the voids between the connection features of the torque-transmitting bodies provide vibration damping.

The hydraulic pump 21 of a vehicle 10 according to the present invention may be of innumerable different constructions tailored to the particular application that a given embodiment of the present invention is used in. In some embodiments of the present invention the hydraulic pump 21 is a variable-displacement hydraulic pump. Variable displacement hydraulic pumps have a plurality of operational states in each of which the hydraulic pump displaces a different volume of hydraulic fluid per cycle of the pump than in the others and any of which the operator may selectively control the variable-displacement hydraulic pump to operate in. Many variable-displacement hydraulic pumps have an infinite number of such different operational states between minimum-output operational state and a maximum-output operational state. Variable displacement hydraulic pumps, thus, afford an operator thereof the ability to change the operating speed and/or the power consumption/output of the accessory systems 22 of a vehicle 10 according to the present invention by selecting different operational states of the hydraulic pump 21 in which the hydraulic pump 21 displaces differing volumes of hydraulic fluid per cycle.

A vehicle 10 according to the present invention may, of course, include any of a number of other components mounted in the area the primary internal combustion engine 16 and the hydraulic pump 21. In some embodiments of the present invention, such as those shown in FIGS. 1, 2, 3, 4, and 8, a vehicle 10 comprises an engine-cooling radiator 39 that is a liquid-to-air heat exchanger that cools engine-cooling liquid when air flows past its cooling coils. In some such embodiments of the present invention the engine-cooling radiator 38 is disposed upon a side of the primary internal combustion engine 16 opposite the driveline end of the crankshaft. In some of these embodiments of the present invention, such as the ones shown in FIGS. 1, 2, 3, 4, and 8, the hydraulic pump 21 is disposed between the engine-cooling radiator 39 and the primary internal combustion engine 16. Such an arrangement of the hydraulic pump 21, the primary internal combustion engine 16, and an engine-cooling radiator 39 according to the present invention is space and cost efficient as, in many cases, the engine-cooling radiator 39 must be spaced from the primary internal combustion engine 16 anyway.

It will, of course, be understood that a vehicle 10 according to the present invention could be of any of a number of different constructions within the guidelines set forth above and that some features of the invention could be employed without a corresponding use of other features.

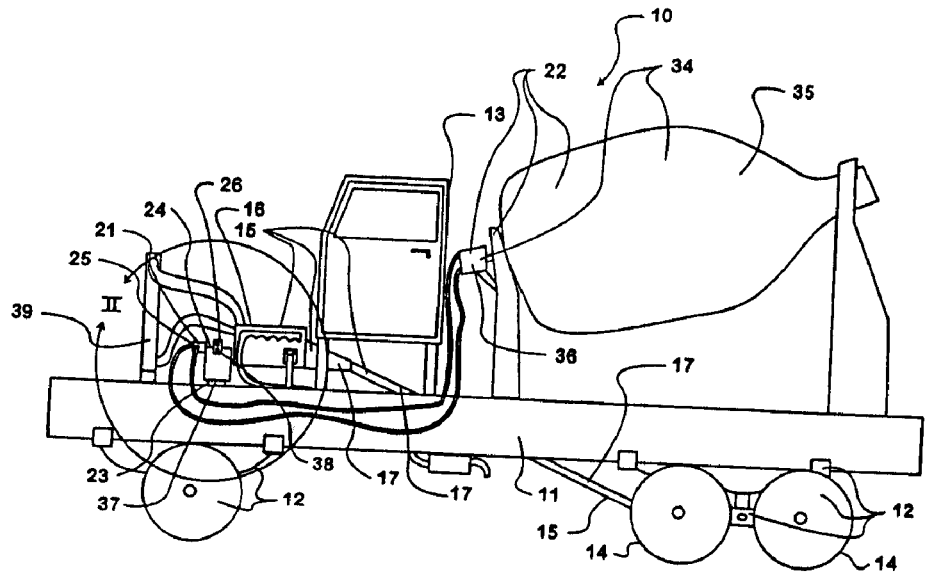

We claim:

1. A vehicle, comprising:
   (a) one or more rigid frame structures to which a majority of other components of said vehicle are engaged directly or indirectly and from which those other components of said vehicle derive support directly or indirectly;
   (b) a suspension system that is constructed and engaged to said one or more rigid frame structures in such a manner to support said one or more rigid frame structures above the ground and to provide said vehicle with relatively low resistance to movement along the ground;
   (c) one or more body structures that are mounted to said one or more rigid frame structures and that are adapted for residence therein and/or thereupon of cargo and/or passengers of said vehicle;
   (d) a powertrain that is mounted to said one or more rigid frame structures of said vehicle and that comprises a primary internal combustion engine with a crankshaft;
   (e) wherein said vehicle comprises one or more driving ground-engaging components that are part of both said suspension system and said powertrain;
   (f) wherein said powertrain comprises driveline components that are operable to couple a driveline end of said crankshaft of said primary internal combustion engine to said driving ground-engaging components to cause them to rotate relative to said rigid frame structures and to move said vehicle along the ground;
   (g) a hydraulic pump having a pump-body directly or indirectly rigidly mounted to an end of said primary internal combustion engine opposite said driveline end of said crankshaft;
   (h) wherein an input shaft of said hydraulic pump is coupled to a non-driveline end of said crankshaft and is powered thereby to pump hydraulic fluid;
   (i) one or more accessory systems that can be powered by pressurized hydraulic fluid delivered from said hydraulic pump;
   (j) wherein said input shaft of said hydraulic pump is substantially in alignment with a centerline of said crankshaft; and
   (k) wherein said hydraulic pump is mounted in spaced relationship to said primary internal combustion engine through a pump-mounting bracket that is rigidly mounted to said primary internal combustion engine adjacent said non-driveline end of said crankshaft.

2. The vehicle of claim 1, wherein:
   (a) said pump-mounting bracket is engaged to and supported by one of said one or more rigid frame structures of said vehicle; and
   (b) a portion of said primary internal combustion engine adjacent said non-driveline end of said crankshaft is supported from said rigid frame structure by said pump-mounting bracket.

3. The vehicle of claim 2, wherein:
   (a) said input shaft of said hydraulic pump is coupled to said non-driveline end of said crankshaft through a loose-joint flexible coupling.

4. The vehicle of claim 3, wherein:
   (a) said accessory system, that derive power from said pressurized hydraulic fluid delivered by said hydraulic pump include a large slurry mixer.

5. The vehicle of claim 4, wherein:
   (a) said pump-mounting bracket comprises a vertically-extending engine-engagement portion that is engaged to said portion of said primary internal combustion engine adjacent said non-driveline end of said crankshaft;
   (b) said pump-mounting bracket comprises a bridge portion that extends away from said engine-engaging portion and said primary internal combustion engine in a direction parallel to said centerline of said crankshaft;
   (c) said bridge portion of said pump-mounting bracket is engaged to and supported by one of said one or more rigid frame structures of said vehicle;
   (d) said pump-mounting bracket comprises a pump mounting portion that is engaged to said bridge portion thereof at a side thereof opposite said engine-engaging portion; and
   (e) said pump body of said hydraulic pump is rigidly mounted to said pump-mounting portion of said pump-mounting bracket.

6. The vehicle of claim 5, wherein:
(a) said pump-mounting portion of said pump-mounting bracket is a vertically-extending pump-mounting wall.

7. The vehicle of claim 6, wherein:
(a) said bridge portion of said pump-mounting bracket is disposed below and/or to the sides of a centerline of said crankshaft, but not directly above said centerline of said crankshaft.

8. The vehicle of claim 7, wherein:
(a) said pump-mounting bracket has a center portion that extends some distance on either side of said input shaft of said hydraulic pump;
(b) said pump-mounting bracket has wings that extend angularly upwardly from said center portion;
(c) each of said wings of said pump-mounting bracket comprises a portion of said bridge portion; and
(d) an underside of said bridge portion of each of said wings either rests upon an elastomeric isolator which, in turn, rests upon one of said rigid frame structures of said vehicle.

9. A vehicle, comprising:
(a) one or more rigid frame structures;
(b) a suspension system that is constructed under and engaged to said one or more rigid frame structures to support said one or more rigid frame structures above the ground;
(c) one or more body structures that are mounted to said one or more rigid frame structures;
(d) a powertrain that is mounted to said one or more rigid frame structures and which comprises a primary internal combustion engine with a crankshaft;
(e) one or more driven, ground-engaging components that are part of both said suspension system and said powertrain;
(f) said powertrain comprising driveline components coupling a driveline end of said crankshaft of said primary internal combustion engine to said driven, ground-engaging components to cause them to rotate relative to said rigid frame structures;
(g) a hydraulic pump having a pump-body rigidly coupled to an end of said primary internal combustion engine opposite said driveline end of said crankshaft;
(h) an input shaft of maid hydraulic pump which is coupled to a non-driveline end of said crankshaft and is powered thereby to pump hydraulic fluid;
(i) one or more accessory systems that can be powered by pressurized hydraulic fluid delivered from said hydraulic pump:
(j) said input shaft of said hydraulic pump being substantially in alignment with a centerline of said crankshaft;
(k) said input shaft of said hydraulic pump being coupled to said non-driveline end of said crankshaft through a loose-joint flexible coupling; and
(l) a mounting bracket rigidly attached between the end of the primary internal combustion engine opposite said driveline end of said crankshaft and the pump-body to couple the pump-body to the primary internal combustion engine with said mounting bracket depending from one or more of said rigid frame structures.

10. A vehicle, comprising:
(a) one or more rigid frame structures to which a majority of other components of said vehicle are engaged directly or indirectly and from which those other components of said vehicle derive support directly or indirectly;
(b) a suspension system that is constructed and engaged to said one or more rigid frame structures in such a manner to support said one or more rigid frame structures above the ground and to provide said vehicle with relatively low resistance to movement along the ground;
(c) one or more body structures that are mounted to said one or more rigid frame structures and that are adapted for residence therein and/or thereupon of cargo and/or passengers of said vehicle;
(d) a powertrain that is mounted to said one or more rigid frame structures of said vehicle and that comprises a primary internal combustion engine with a crankshaft;
(e) wherein said vehicle comprises one or more driving ground-engaging components that are part of both said suspension system and said powertrain;
(f) wherein said powertrain comprises driveline components that are operable to couple a driveline end of said crankshaft of said primary internal combustion engine to said driving ground-engaging components to cause them to rotate relative to said rigid frame structures and to move said vehicle along the ground;
(g) wherein said vehicle comprises a hydraulic pump having a pump-body directly or indirectly rigidly mounted to an end of said primary internal combustion engine opposite said driveline end of said crankshaft;
(h) wherein an input shaft of said hydraulic pump is coupled to a non-driveline end of said crankshaft and is powered thereby to pump hydraulic fluid;
(i) wherein said vehicle comprises one or more accessory systems that can be powered by pressurized hydraulic fluid delivered from said hydraulic pump;
(j) wherein said hydraulic pump is a variable-displacement hydraulic pump;
(k) wherein said input shaft of said hydraulic pump is substantially in alignment with a centerline of said crankshaft;
(l) said one or more accessory systems that derive power from said pressurized hydraulic fluid delivered by said hydraulic pump include a large slurry mixer; and
(m) an engine-cooling radiator disposed on a side of said primary internal combustion engine opposite said driveline end of said crankshaft and said driveline components that are operable to connect said driveline end of said crankshaft to said driving ground-engaging components; and
(n) wherein said hydraulic pump is disposed between said engine-cooling radiator and said primary internal combustion engine.

11. A vehicle, comprising:
(a) one or more rigid frame structures to which a majority of other components of said vehicle are engaged directly or indirectly and from which those other components of said vehicle derive support directly or indirectly;
(b) a suspension system that is constructed and engaged to said one or more rigid frame structures in such a manner to support said one or more rigid frame structures above the ground and to provide said vehicle with relatively low resistance to movement along the ground;
(c) one or more body structures that are mounted to said one or more rigid frame structures and that are adapted for residence therein and/or thereupon of cargo and/or passengers of said vehicle;

(d) a powertrain that is mounted to said one or more rigid frame structures of said vehicle and that comprises a primary internal combustion engine with a crankshaft;

(e) wherein said vehicle comprises one or more driving ground-engaging components that are part of both said suspension system and said powertrain;

(f) wherein said powertrain comprises driveline components that are operable to couple a driveline end of said crankshaft of said primary internal combustion engine to said driving ground-engaging components to cause them to rotate relative to said rigid frame structures and to move said vehicle along the ground;

(g) wherein said vehicle comprises a hydraulic pump having a pump-body mounted to an end of said primary internal combustion engine and/or one of said rigid frame structures adjacent said non-driveline end of said crankshaft;

(h) wherein an input shalt of said hydraulic pump is coupled to a non-driveline end of said crankshaft and is powered thereby to pump hydraulic fluid;

(i) wherein said vehicle comprises one or more accessory systems that can be powered by pressurized hydraulic fluid delivered from said hydraulic pump;

(j) wherein said hydraulic pump is a variable-displacement hydraulic pump;

(k) wherein said input shaft of said hydraulic pump is substantially in alignment with a centerline of said crankshaft;

(l) an engine-cooling radiator disposed on a side of said primary internal combustion engine opposite said driveline end of said crankshaft and said driveline components that are operable to connect said driveline end of said crankshaft to said driving ground-engaging components; and (m) wherein said hydraulic pump is disposed between said engine-cooling radiator and said primary internal combustion engine.

12. A vehicle, comprising:

(a) one or more rigid frame structures to which a majority of other components of said vehicle are engaged directly or indirectly and from which those other components of said vehicle derive support directly or indirectly;

(b) a suspension system that is constructed and engaged to said one or more rigid frame structures in such a manner to support said one or more rigid frame structures above the ground and to provide said vehicle with relatively low resistance to movement along the ground;

(c) one or more body structures that are mounted to said one or more rigid frame structures and that are adapted for residence therein and/or thereupon of cargo and/or passengers of said vehicle;

(d) a powertrain that is mounted to said one or more rigid frame structures of said vehicle and that comprises a primary internal combustion engine with a crankshaft;

(e) wherein said vehicle comprises one or more driving ground-engaging components that are part of both said suspension system and said powertrain;

(f) wherein said powertrain comprises driveline components that are operable to couple a driveline end of said crankshaft of said primary internal combustion engine to said driving ground-engaging components to cause them to rotate relative to said rigid frame structures and to move said vehicle along the ground;

(g) a hydraulic pump having a pump-body rigidly mounted to an end of said primary internal combustion engine opposite said driveline end of said crankshaft;

(h) wherein an input shaft of said hydraulic pump is coupled to a non-driveline end of said crankshaft and is powered thereby to pump hydraulic fluid;

(i) wherein said vehicle comprises one or more accessory systems that can be powered by pressurized hydraulic fluid delivered from said hydraulic pump;

(j) wherein said input shaft of said hydraulic pump is substantially in alignment with a centerline of said crankshaft; and (k) a pump-mounting bracket that is rigidly attached to said primary internal combustion engine adjacent said non-driveline end of said crankshaft and to said pump-body, holding said pump-body and said primary internal combustion engine in a spatially fixed, separated relationship.

13. The vehicle of claim 12, wherein:

(a) said pump-mounting bracket is engaged to and supported by one of said one or more rigid frame structures; and (b) a portion of said primary internal combustion engine adjacent said non-driveline end of said crankshaft is supported from said frame structure by said pump-mounting bracket.

14. The vehicle of claim 13, wherein;

(a) said pump-mounting bracket comprises a vertically-extending engine-engagement portion that is engaged to said portion of said primary internal combustion engine adjacent said non-driveline end of said crankshaft:

(b) said pump-mounting bracket comprises a bridge portion that extends away from said engine-engaging portion and said primary internal combustion engine in directions parallel to said centerline of said crankshaft:

(c) said bridge portion of said pump-mounting bracket is engaged to and supported by one of said one or more frame structures of said vehicle;

(d) said pump-mounting bracket comprises a pump mounting portion that is engaged to said bridge portion thereof at a side thereof opposite said engine-engaging portion; and (e) said pump body of said hydraulic pump is rigidly mounted to said pump-mounting portion of said pump-mounting bracket.

15. The vehicle of claim 14, wherein:

(a) said pump-mounting portion of said pump-mounting bracket is a vertically-extending pump-mounting wall.

16. The vehicle of claim 15, wherein:

(a) said bridge portion of said pump-mounting bracket is disposed below and/or to the sides of a centerline of said crankshaft, but not directly above said centerline of said crankshaft.

17. The vehicle of claim 14, wherein:

(a) said pump-mounting bracket has a center portion that extends some distance on either side of said input shaft of said hydraulic pump;

(b) said pump-mounting bracket has wings that extend angularly upwardly from said center portion;

(c) each of said wings of said pump-mounting bracket comprises a portion of said bridge portion; and (d) an underside of said bridge portion of each of said wings either rests upon an elastomeric isolator which, in turn, rests upon one of said frame structures of said vehicle.

18. The vehicle of claim 13, wherein:
(a) said input shaft of said hydraulic pump is coupled to said non-driveline end of said crankshaft through a loose-joint flexible coupling.

19. The vehicle of claim 12, wherein:
(a) said input shaft of said hydraulic pump is coupled to said non-driveline end of said crankshaft through a loose-joint flexible coupling.

20. A vehicle, comprising:
(a) one or more rigid frame structures to which a majority of other components of said vehicle are engaged directly or indirectly and from which those other components of said vehicle derive support directly or indirectly;
(b) a suspension system that is constructed and engaged to said one or more rigid frame structures in such a manner to support said one or more rigid frame structures above the ground and to provide said vehicle with relatively low resistance to movement along the ground;
(c) one or more body structures that are mounted to said one or more rigid frame structures and that are adapted for residence therein and/or thereupon of cargo and/or passengers of said vehicle;
(d) a powertrain that is mounted to said one or more rigid frame structures of said vehicle and that comprises a primary internal combustion engine with a crankshaft;
(e) one or more driving ground-engaging components that are part of both said suspension system and said powertrain;
(f) wherein said powertrain comprises driveline components that are operable to couple a driveline end of said crankshaft of said primary internal combustion engine to said driving ground-engaging components to cause them to rotate relative to said rigid frame structures and to move said vehicle along the ground;
(g) a hydraulic pump having a pump-body rigidly mounted to an end of said primary internal combustion engine opposite said driveline end of said crankshaft;
(h) wherein an input shaft of said hydraulic pump is coupled to a non-driveline end of said crankshaft and is powered thereby to pump hydraulic fluid;
(i) one or more accessory systems that can be powered by pressurized hydraulic fluid delivered from said hydraulic pump;
(j) wherein said input shaft of said hydraulic pump is coupled to said on-driveline end of said crankshaft through a loose-joint coupler;
(k) wherein said input shaft of said hydraulic pump is substantially in alignment with a centerline of said crankshaft;
(l) said vehicle further comprises an engine-cooling radiator disposed on a side of said primary internal combustion engine opposite said driveline end of said crankshaft and said driveline components that are operable to connect said driveline end of said crankshaft to said driving around-engaging components; and
(m) said hydraulic pump is disposed between said engine-cooling radiator and said primary internal combustion engine.

* * * * *

UNITED STATES PATENT AND TRADEMARK OFFICE
CERTIFICATE OF CORRECTION

PATENT NO. : 6,942,375 B2
APPLICATION NO. : 10/282576
DATED : September 13, 2005
INVENTOR(S) : Larry N. Chanasyk and William C. McNeilly It is certified that error appears in the above-identified patent and that said Letters Patent is hereby corrected as shown below:

The title page should be deleted and replaced with the attached title page.

The drawing sheets, consisting of Figs. 1-8 should be deleted and replaced with the attached formal drawings.

Signed and Sealed this

Twenty-seventh Day of June, 2006

JON W. DUDAS
*Director of the United States Patent and Trademark Office*

(12) United States Patent
Chanasyk et al.

(10) Patent No.: US 6,942,375 B2
(45) Date of Patent: Sep. 13, 2005

(54) VEHICLE ACCESSORY POWER ARRANGEMENT

(75) Inventors: Larry N. Chanasyk, Chatham (CA); William C. McNeilly, Fort Wayne, IN (US)

(73) Assignee: International Truck Intellectual Property Company, LLC, Warrenville, IL (US)

(*) Notice: Subject to any disclaimer, the term of this patent is extended or adjusted under 35 U.S.C. 154(b) by 65 days.

(21) Appl. No.: 10/282,576

(22) Filed: Oct. 29, 2002

(65) Prior Publication Data

US 2004/0081014 A1 Apr. 29, 2004

(51) Int. Cl.[7] ............................................. B28C 5/18
(52) U.S. Cl. ............................................. 366/61
(58) Field of Search .................. 366/44, 54, 46–62

(56) References Cited

U.S. PATENT DOCUMENTS

| | | | | |
|---|---|---|---|---|
| 2,729,435 A | * | 1/1956 | Harbers et al. | 366/61 |
| 3,080,152 A | * | 3/1963 | Lendved | 366/44 |
| 3,160,398 A | * | 12/1964 | Green | 366/61 |
| 3,215,411 A | * | 11/1965 | Pitts | 366/61 |
| 6,159,102 A | | 12/2000 | Hennessey et al. | |

FOREIGN PATENT DOCUMENTS

GB          936493      * 9/1963

* cited by examiner

*Primary Examiner*—David Sorkin
(74) *Attorney, Agent, or Firm*—Jeffrey P. Calfa; Dennis Kelly Sullivan; Susan L. Lukasik

(57) ABSTRACT

A vehicle with one or more accessory systems that are capable of drawing power from a flow of pressurized hydraulic fluid and utilizing that power toward their intended functionality. The vehicle has a powertrain including a primary internal combustion engine and driveline components that are operable to couple the driveline end of a crankshaft of the primary internal combustion engine to one or more driven ground-engaging components of the vehicle to move the vehicle along the ground. The vehicle includes a hydraulic pump that is coupled to the non-driveline end of the crankshaft and that provides a flow of pressurized hydraulic fluid for powering the accessory systems of the vehicle.

20 Claims, 8 Drawing Sheets